3,060,222
PRODUCTION OF DIALKYL ESTERS OF ISO-
AND/OR TEREPHTHALIC ACID
Rudolf Keller and Joseph Schneiders, Ludwigshafen (Rhine), and Gotthilf Wenner, Ludwigshafen (Rhine)-Oggersheim, Germany, assignors to Badische Anilin- & Soda-Fabrik Aktiengesellschaft, Ludwigshafen (Rhine), Germany
No Drawing. Filed Dec. 21, 1959, Ser. No. 860,635
Claims priority, application Germany Dec. 23, 1958
7 Claims. (Cl. 260—475)

The present invention relates to an improved process for the direct production of iso- and terephthalic acid dialkyl esters. More specifically, the invention relates to a process according to which benzene hydrocarbons which contain two oxidizable side chains are simultaneously oxidized in an alkanolic medium and converted into the esters of benzene-meta- or -para-dicarboxylic acids.

It is known to oxidize xylene or other dialkylbenzenes with air or oxygen in the presence of catalysts. However, the oxidation of the hydrocarbons to the corresponding dicarboxylic acids offers difficulties, because it is substantially only one of the two alkyl groups of the initial hydrocarbons which is fully oxidized to the carboxyl group, whereas the other can only be oxidized with difficulty. In order to avoid these difficulties, attempts have been made in the oxidation of xylene, for example, to convert the oxidation products which it is difficult to oxidize further, as for example toluic acid, into derivatives, for example esters, salts, amides or the anhydride, and to oxidize these further with oxidizing agents containing oxygen. It is true that in this way it is possible to arrive at phthalic acids, but the process has the disadvantage that the dicarboxylic acids are obtained in the form of their half derivatives which must be split up or, if diesters are required, must be converted into these. Moreover, the conversion in stages is time-consuming and requires additional expenditure of labor and apparatus.

It is also known to prepare dialkyl esters of phthalic acids directly from aromatic hydrocarbons and alkanols by treating a xylene in liquid phase in the presence of an alkanol with oxygen or a gas containing oxygen. According to this procedure xylene has been heated to about 100° to 200° C. in a pressure vessel in the presence of an oxidation catalyst and oxygen or air and methanol have been led at pressures up to 20 atmospheres through the hydrocarbon together or separately in an hourly amount of about 100 to 200 liters of air and 10 to 1000 grams of methanol in vapor form per 1000 grams of initial xylene. This known process depends on the continuous introduction of methanol into the reaction mixture. The methanol which has been introduced and not immediately reacted escapes in vapor form together with the oxidizing agent which has not been used up and with reaction water and hydrocarbon constituents entrained therewith, so that the liquid phase in the reaction vessel does not contain any appreciable amounts of methanol. It has moreover been found that when using dialkylbenzenes other than xylene, for example dialkylbenzenes with alkyl radicals of higher carbon number, as for example isopropyl radicals, no phthalic acid diesters, or substantially no phthalic acid diesters are obtained by the process. It is also a considerable disadvantage of the said known process that the xylene used for the reaction for the most part is not converted into the oxidation stage of benzene dicarboxylic acid and the oxidized and esterified product formed from the hydrocarbon consists to the extent of less than 20% of substances which have reached the oxidation stage of dicarboxylic acid.

The object of the present invention is to provide a process for the production of dialkyl esters of iso- and/or terephthalic acid which is easy to carry out industrially. Another object of the invention is to provide a process of the said kind in which—in contrast to earlier processes—not only is considerably more initial hydrocarbon oxidized directly to the oxidation stage of benzene dicarboxylic acids but in which also the diesters are obtained directly and in a greater yield.

A further object is to effect, in the oxidation and simultaneous esterification, a diminution of the amount of partial oxidation products, for example toluic acid or phthalaldehydic acid stages, in favor of the increased formation of products of the esterified final oxidation stage, i.e., esters of th dicarboxylic acid stage.

Yet another object is to provide a process of the said kind which is generally applicable to all benzene hydrocarbons containing two side chains capable of oxidation, so that the direct production of the diesters is substantially independent of the choice of the initial hydrocarbon.

These and other objects and advantages of the present invention are achieved by treating with oxygen-containing gases, preferably with pure oxygen, at temperatures between 120° and 220° C. and pressures of at least 8 atmospheres, especially 15 to 500 atmospheres, a solution of at least one dialkylbenzene which contains the substituents in the same position as the ester desired and in which each alkyl group contains 1 to 4 carbon atoms and up to two of the hydrogen atoms attached to any of the carbon atoms of the alkyl groups may be replaced by chlorine atoms, in an alkanol with 1 to 4 carbon atoms, the content of alkanol in the solution amounting to at least 60% by weight and advantageously 80 to 95% by weight.

The discovery that it is possible to oxidize and esterify the hydrocarbons or the derivatives chlorinated in the side chains, in an alkanolic solution is truly unexpected. It is surprising that the alcohol, which in the liquid phase is constantly exposed to the action of the oxidizing agent, should not undergo appreciable oxidative decomposition reactions and not give rise to any particular danger. Moreover it was not to be foreseen that under the reaction conditions the hydrocarbon would be attacked by the oxidizing agent containing molecular oxygen rather than that the alcohol should be converted into products of a higher oxidation stage. The alcohol is therefore used for the esterification and remains as solvent. The unexpectedness of this discovery is the more striking since it must have been assumed that a product which has already been oxidized, as for example an alcohol, would be easier to oxidize further than it would be to oxidize a hydrocarbon.

As dialkylbenzenes with 1 to 4 carbon atoms in each alkyl group there are suitable those which contain the oxidizable side chains attached in meta- or para-position. Suitable compounds include meta-xylene, para-xylene, meta- or para-diethylbenzene and the corresponding di-isobutylbenzenes. Especially suitable dialkylbenzenes are those in which at least one of the alkyl groups is an isopropyl group. There are especially suitable for example 1,3- or 1,4-cymene and above all di-isopropyl-benzene. Benzene hydrocarbons in which at least one carbon atom in one or both alkyl groups is substituted by one or two chlorine atoms are also suitable initial materials. Oxidizable side chains therefore also include chlorine-substituted alkyl groups with 1 to 4 carbon atoms, especially mono- or di-chlor substituted alkyl groups, and it is immaterial at which of the carbon atoms the chlorine has entered into the alkyl radical. Suitable chlorine-substituted dialkylbenzenes are for example meta- and para-xylyl chloride, xylylene dichloride, xylylidene dichloride, para-chlormethylcumene, meto-chlormethylcumene, 1,3- and 1,4-chlorethylcumene and 1,4-bis-(chlorethyl)-benzene.

The said benzene derivatives containing oxidizable side chains in 1,3- or 1,4-position may be used in admixture with each other and/or in admixture with other benzene hydrocarbons. For example crude technical xylenes which contain about 50 to 80% by weight of meta- and para-xylene, about 10 to 40% by weight of ortho-xylene and up to about 10% by weight of diethylbenzene, may be used as initial materials.

For the oxidation and simultaneous esterification of the benzene dicarboxylic acids formed intermediately in the oxidation, the initial benzene hydrocarbons are used dissolved in alkanols. Suitable alkanols are lower alcohols with up to 4 carbon atoms, such as methanol, ethanol, propanol, butanol, isopropanol, isobutanol and tertiary butanol. The solvent which is especially preferred is methanol. For the preparation of the solution, the solvent is used in such an amount that the initial solution contains at least 60% by weight of alkanol. The amount of 60% by weight is critical inasmuch as otherwise the yields of benzene dicarboxylic acid esters fall off strongly. It is not recommended to use solutions containing more than 98% by weight of methanol because then the process cannot be carried out sufficiently economically. It is advantageous to work with solutions containing 60 to 95% by weight, preferably 80 to 95% by weight of alkanol.

The most suitable oxidizing agent is pure oxygen or gas mixtures containing the same which have a high content of oxygen, as for example 50% by volume or more with reference to the mixture. Air or other oxygen-containing mixtures with a low oxygen content may also be used.

The oxidation takes place without the presence of agents for accelerating the reaction. It is however preferred to coemploy catalysts. Any catalyst known for the air oxidation of alkylbenzenes is suitable for the purpose. Soluble salts of manganese, cobalt or vanadium for example are especially suitable. Examples are the salts of these metals of fatty acids, such as acetic acid, butyric acid or ethylhexanic acid, of unsaturated acids, especially of the oleic acid series, as for example crotonic acid or oleic acid, or of naphthenic acids. For the oxidation the salts or mixtures of the same are preferably used in amounts of 0.1 to 5% by weight with reference to the total amount of the initial solution to be oxidized. Besides the catalysts, other substances which promote the reaction, as for example bromides, such as alkali metal bromides, especially potassium or ammonium bromide, or heavy metal bromides, such as manganese, cobalt or nickel bromide, may be used, the amount of these promoting additives being of the same order of magnitude as the coemployed catalysts.

The oxidation takes place in the liquid phase at temperatures of 120° to 220° C., advantageously at about 140° to 200° C. The pressure should be so high that under the working temperature chosen the alcohol used is also present in the liquid state with the exception of that proportion which is vaporous under the working conditions by reason of the partial pressure. The minimum pressure is 8 atmospheres. In general operation is at pressures of 15 to about 60 atmospheres, advantageously at 20 to 40 atmospheres. It is also possible to work at higher pressures, as for example at 100 or 150 atmospheres, up to 500 atmospheres. The high pressures are especially suitable and to be used with advantage when a rapid and above all an extensive conversion of the initial hydrocarbon is desired at relatively low working temperatures and therefore better, i.e., greater, absorption of oxygen in the liquid phase.

The oxidation may be carried out in the manner known per se for working in the liquid phase, either batchwise or in continuous operation. For example the procedure may be that the alkanolic solution of the dialkylbenzene and the catalyst are charged in a pressure-tight vessel, the vessel heated and after the reaction temperature has been reached oxygen or a gas mixture containing the same forced in up to the chosen working pressure.

It has proved to be preferable, in order to achieve a rapid course of the reaction, to decompress the vessel at least partially, possibly after previous cooling, from time to time, for example every ½ to 3 hours, and to force in oxygen afresh. In this way, when working discontinuously, the process may be carried on until the initial material to be oxidized has been practically completely used up. When working continuously, it is preferable to draw off periodically a part of the gas and to replace it by oxygen. When working continuously, fresh initial material solution is continuously supplied to the pressure vessel and a corresponding amount of reaction solution drawn off, while oxygen is led through the solution in the vessel and provision is made, for example by means of a relief valve, to prevent the pressure from rising above the chosen working pressure. The supply of initial solution is preferably regulated so that the mean residence period of the solution in the oxidation zone is about 1 to 6 hours, advantageously 2 to 4 hours.

Entrained solvent vapors are recovered from the waste gases by condensation by cooling, preferably prior to complete decompression.

After cooling and decompression, the working up of the reaction solution takes place by methods known per se, for example by filtration and distillation. Initial materials recovered and oxidation intermediates, as for example toluic acid alkyl esters, diacetylbenzene, acetylbenzoic acid alkyl esters, para- or meta-bis-(2)-hydroxyisopropylbenzene, aldehydic benzoic acid esters and toluic aldehyde, are preferably added again to the initial solution or further oxidized by themselves, preferably after separating the water still contained in the reaction solution and formed by the reaction, and the dark colored resins remaining as distillation residue.

The iso- or terephthalic acid esters obtained are substantially pure and can be directly worked up, for example to polyesters, if desired after recrystallization and/or vacuum distillation.

The following examples will further illustrate this invention but the invention is not restricted to these examples. Unless otherwise specified, the parts given in the examples are parts by weight. Parts by weight bear the same relationship to the parts by volume as the gram does to the liter.

*Example 1*

2,240 parts of methanol, 560 parts of para-di-isopropyl benzene, 3 parts of cobalt naphthenate and 3 parts of manganese oleate are introduced into a pressure vessel of 4.5 parts by volume capacity which is provided with a stirrer, two supply pipes, a drain-off valve at the bottom and a gas outlet pipe, and the vessel is heated to 160° C. 250 parts by volume (STP) of oxygen are forced in per hour through one of the supply pipes. The pressure in the vessel is adjusted to 40 atmospheres by a relief valve which is provided in the gas outlet pipe. After about 3 hours, about 900 parts of the reaction solution are drawn off through the drain-off valve and 800 parts of fresh di-isopropylbenzene solution containing 80% of methanol and to which 0.8 part of cobalt naphthenate and 0.8 part of manganese stearate have been added, are supplied to the vessel. The withdrawal of reaction solution and the introduction of fresh methanolic solution is repeated hourly with about the same amounts as specified above, and the oxidation intermediates specified below are added to the fresh solution.

The hot reaction solution is allowed to cool. The dimethyl terephthalate is separated by filtration and the mother liquor worked up by distillation. From the amount of reaction solution withdrawn hourly there are obtained on an average about 140 to 150 parts of crude dimethyl terephthalate. By fractional distillation of the mother liquor, about 550 parts of methanol are recovered. Oxidation intermediates soluble in methanol and also about 150 parts of water are obtained. In the body of the still there remains a small residue consisting of dark colored resins.

The amount of dimethyl terephthalate obtained per hour is about 70 to 80% with reference to the amount of fresh di-isopropylbenzene supplied per hour. After recrystallization and a subsequent vacuum distillation, 145 parts of ester of the melting point 141° C. are obtained from 150 parts of the crude ester.

*Example 2*

30 parts of meta-di-isopropylbenzene, 170 parts of methanol and 1 part of manganese acetate are introduced into a pressure vessel of 0.35 part by volume capacity. The vessel is heated to 170° C. while shaking and oxygen is forced in up to a pressure of 50 atmospheres. After a short time the pressure falls to about 30 atmospheres. It is restored to 50 atmospheres by forcing in further oxygen and the supply of oxygen is repeated until no further decrease in pressure can be observed in the vessel over a period of several hours. The vessel is allowed to cool and decompressed. The vessel is again closed, heated to 170° C. and the treatment with oxygen at 50 atmospheres in the above-mentioned way is repeated. In all the treatment is repeated eight times. Then the reaction mixture is removed from the cooled and decompressed vessel. It consists of 20 parts of dimethyl isophthalate, methanol, water and about 8 to 10 parts of oxidation intermediates which, after a distillation in vacuo, may be added to a further batch of the same size, whereby the yield is increased by about 20%.

*Example 3*

3,600 parts of methanol are mixed with 400 parts of para-di-isopropylbenzene and 20 parts of cobalt bromide and heated to 160° C. in a pressure-tight stirring vessel. Through a supply pipe at the bottom of the pressure vessel, 200 parts by volume (STP) of oxygen are led into the vessel per hour and the pressure is maintained at 20 atmospheres. The escaping gas is cooled and the condensed liquid portion is returned to the reaction vessel by means of a pump. After about 3 hours, the absorption of oxygen has ceased. By cooling and filtration of the reaction mixture, about 200 parts of dimethyl terephthalate are obtained. From the mother liquor there are recovered by distillation 120 parts of monomethyl terephthalate and 40 parts of oxidation intermediates. If these are added to a subsequent oxidation batch of the same size, the yield of dimethyl terephthalate is increased to 370 parts.

*Example 4*

300 parts of para-xylene, 2,100 parts of methanol, 2 parts of manganese acetate and 10 parts of cobalt bromide are introduced into a pressure vessel of a capacity of 3.5 parts by volume which is provided with a stirrer, two supply pipes, a drain valve at the bottom and a gas withdrawal pipe, and the vessel is heated to 175° C. 400 parts by volume (STP) of a mixture of oxygen and nitrogen containing 50% of oxygen are led in per hour through one of the supply pipes at the bottom of the vessel. The pressure in the vessel is adjusted to 40 atmospheres by a relief valve provided in the gas withdrawal pipe. After about an hour, the removal of the reaction mixture through the drain valve is commenced. 2,650 parts of reaction solution are drained off from the vessel per hour and the same amount of fresh solution consisting of 300 parts of para-xylene, 2,100 parts of methanol, 2 parts of manganese acetate and 10 parts of cobalt bromide are supplied. The amount of gas supplied per hour is maintained at 400 parts of the gas mixture containing 50% of oxygen.

The hot reaction solution drained off is allowed to cool, the dimethyl terephthalate is separated off by filtration and the mother liquor worked up in the usual way.

From the reaction solution withdrawn after the first hour there are obtained, besides about 165 parts of dimethyl terephthalate, also 100 parts of monomethyl terephthalate, 110 parts of methyl toluate, 20 parts of toluic acid and 55 parts of other partial oxidation products of xylene, as for example toluic aldehyde and toluic aldehydic acid esters, and unreacted para-xylene.

If the monomethyl terephthalate and the whole of the partial oxidation products formed per hour and the recovered para-xylene be added to the amount of fresh solution added per hour and these products are returned continuously to the oxidation and esterification cycle, the percentage composition of the products obtained per hour remains constant after only a few passages through the vessel. Besides 520 parts of dimethyl terephthalate then formed per hour there are also isolated 300 parts of monomethyl terephthalate, 200 parts of toluic acid esters, 20 parts of toluic acid and 50 parts of partial oxidation products and xylene which are returned to the circulation. The diemthyl terephthalate obtained may be used directly for polycondensation after a single recrystallization from methanol and distillation in vacuo.

*Example 5*

40 parts of meta-xylene, 160 parts of methanol, 1 part of manganese acetate, 1 part of cobalt bromide and 1 part of vanadic acid are introduced into a pressure vessel having a capacity of 0.35 part by volume. The vessel is heated to 175° C. while shaking and oxygen is forced in cautiously up to a pressure of 50 atmospheres. After some time, the pressure has fallen to about 30 atmospheres. It is restored to 50 atmospheres by forcing in further oxygen and the supply of oxygen is repeated until no further fall in pressure is observed even after a prolonged period. The vessel is allowed to cool and decompressed. The reaction mixture consists of 22 parts of dimethyl isophthalate, 14 parts of monomethyl isophthalate, 17 parts of meta-toluic acid ester, 5 parts of toluic acid, 4 parts of other partial oxidation products of meta-xylene and unreacted meta-xylene as well as methanol and water.

The monomethyl isophthalate, the partial oxidation products of meta-xylene and the small proportion of unreacted meta-xylene are added to a further batch of the same size, whereby the yield of dimethyl isophthalate is raised to about 90% of the theory after 3 to 4 returns.

*Example 6*

The procedure and conditions of Example 5 are followed but with the replacement of the meta-xylene by 40 parts of a xylene isomer mixture of the following composition:

20% by weight of para-xylene
30% by weight of ortho-xylene
45% by weight of meta-xylene and
5% by weight of ethylbenzene After working up the reaction mixture and returning the partially esterified and partially oxidized products there is obtained, after a few pasasges through the vessel, an ester mixture composed as follows:

11 parts of dimethyl terephthalate,
17 parts of dimethyl ortho-phthalate,
25 parts of dimethyl isophthalate and
2 parts of methyl benzoate.

*Example 7*

A pressure vessel having a capacity of 0.35 part by volume is charged with 40 parts of a mixture of isomers of diethylbenzene, 160 parts of methanol and 2 parts of cobalt bromide and closed. The diethylbenzene isomer mixture is composed of about 15% by weight of ortho-diethylbenzene, 35% by weight of para-diethylbenzene and 50% by weight of meta-diethylbenzene. The pressure vessel is heated to 170° C. while shaking and then oxygen is forced into the vessel up to a total pressure of 50 atmospheres. When the pressure has fallen to about 30 atmospheres, it is restored to 50 atmospheres again by further forcing in of oxygen. The supply of oxygen is repeated until no further decrease in pressure is observed even after a prolonged period. The vessel is allowed to cool, decompressed, closed, again heated to 170° C. and the oxygen treatment at 50 atmospheres continued in the specified way. After repeating this treatment for 4 to 5 times, the reaction mixture is taken out from the vessel after cooling and worked up as usual. It consists of 3 parts of dimethyl ortho-phthalate, 7 parts of dimethyl terephthalate and 10 parts of dimethyl isophthalate and also contains 13 parts of phthalic acid monocarboxylic acid esters and 15 parts of oxidation intermediates as well as methanol and water. The monocarboxylic acid esters and oxidation intermediates are admixed to the next batch and after a few passages through the vessel, dicarboxylic acid esters are obtained in the following amount and composition:

7 parts of dimethyl ortho-phthalate,
18 parts of dimethyl terephthalate and
24 parts of dimethyl isophthalate.

The yield therefore is 85% of the theory.

Example 8

500 parts of para-cymene, 2,000 parts of methanol, 5 parts of manganese acetate and 5 parts of cobalt bromide are introduced into a pressure vessel provided with the equipment specified in Example 4. The vessel is heated to 170° C. 250 parts by volume (STP) of oxygen are forced into the vessel hourly and the pressure is maintained at 40 atmospheres by means of a relief valve provided in the gas outlet pipe. After about 2 hours, some 1,440 parts of the reaction solution are withdrawn per hour through a drain valve at the bottom and 1,250 parts of the fresh methanol solution which contains 20% of cymene and to which 2 parts of manganese acetate, 2 parts of cobalt bromide and the partly esterified oxidation intermediates specified below are added per hour. The oxidation solution is allowed to cool and the dimethyl terephthalate is separated off by filtration and the mother liquor worked up as usual. Besides methanol and water there are obtained, after the percentage composition of the reaction mixture has stabilized after several circulations of the oxidation and esterification products which have not been converted to dimethyl terephthalate, about 300 parts per hour of dimethyl terephthalate, 150 parts of monomethyl terephthalate, 100 parts of toluic acid ester, 20 parts of toluic acid and 30 parts of partial oxidation products. The yield of dimethyl terephthalate is thus about 82% of the theory.

Example 9

A pressure vessel of a capacity of 1.2 parts by volume which is fitted with a stirrer, a supply pipe at the bottom and an outlet pipe at the top of the vessel, is charged with 640 parts of methanol, 160 parts of para-isopropylbenzyl chloride, 2.5 parts of manganese acetate, 2.5 parts of cobalt bromide and 40 parts of solid sodium hydroxide.

The vessel is closed and heated to 170° C. while stirring. Through the supply pipe at the bottom of the vessel, oxygen compressed to 36 atmospheres is led in in an hourly amount of 25 parts by volume (STP). The gas outlet at the top of the vessel is opened periodically by actuation of a relief valve, so that the pressure in the reaction vessel does not rise above 35 atmospheres. At the same time provision is made by external cooling surfaces that the temperature is kept at about 170° C. When the absorption of oxygen declines markedly, which is the case after about 3 hours, the valve of the oxygen supply is closed and the pressure vessel is heated for about an hour at 250° C. with the relief valve closed. The reaction product is then allowed to cool and removed from the vessel. For working up, the volatile compounds of the reaction mixture are separated from the salt-like compounds by distilling the reaction product and when a sump temperature of about 230° C. has been reached, leading into the still methanol preheated to 250° C. until no further volatile products pass over. By cooling the methanol vapor distillate to 0° C., the dimethyl terephthalate crystallizes out and is separated from the mother liquor by filtration. 110 parts of this product are obtained which is a yield of 60% of the theory. By distillation there are obtained from the mother liquor, besides methanol and water, about 40 parts of oxidation intermediates consisting mainly of para-acetylbenzoic acid and the methyl ester thereof, para-hydroxymethylacetophenone and para-acetylbenzaldehyde.

These are added to another batch of the same size, whereby the yield of dimethyl ester increases by 20% so that from the next batch about 145 to 150 parts of dimethyl terephthalate are obtained.

Example 10

7 parts of para-xylylene dichloride, 20 parts of methanol, 0.1 part of manganese acetate, 0.1 part of cobalt bromide and 3.2 parts of sodium hydroxide are charged into a pressure-tight shaking vessel of 0.05 part by volume capacity and the vessel is heated to 175° C. While shaking, oxygen is then forced into the pressure vessel until the total pressure is about 40 atmospheres. The oxygen is used up by the oxidation and this becomes evident by a fall in pressure. When the pressure has fallen to about 25 atmospheres, it is restored to 40 atmospheres by forcing in further oxygen. This procedure is followed until no further decrease in pressure takes place even after a prolonged period. The vessel is then allowed to cool and the reaction product is taken out. By working up there are obtained, besides sodium chloride, methanol and water, about 3.0 parts of dimethyl terephthalate and 3.5 parts of oxidation intermediates.

If the latter are added to a further batch and the product worked up in the same way, about 6 parts of dimethyl terephthalate and 3.5 parts of oxidation intermediates are obtained so that the yield of dimethyl terephthalate is raised to 79% of the theory.

Example 11

1,200 parts of methanol, 800 parts of para-di-isopropyl benzene, 50 parts of manganese bromide and 50 parts of cobalt bromide are placed in a pressure vessel of 3 parts by volume capacity which is provided with a stirrer, 2 supply pipes, a drain-off valve at the bottom and a gas outlet pipe and the vessel is heated to 150° C. 270 parts by volume (STP) of oxygen are then forced in per hour through one of the supply pipes and the pressure is adjusted to 15 atmospheres by means of a relief valve which is provided in the gas outlet pipe. After some 4 hours, about a quarter of the contents of the pressure vessel is drawn off through the drain-off valve and 300 parts of fresh methanol, 200 parts of para-di-isopropyl benzene, 12.5 parts of manganese bromide, 12.5 parts of cobalt bromide and also the oxidation intermediates specified below are returned to the vessel.

The reaction solution withdrawn is subjected to a distillation, all volatile compounds passing over up to a flask temperature of 250° C. The distillation process may be assisted by leading in superheated methanol vapor. The catalyst salts employed are recovered from the residue and the dimethyl terephthalate is obtained from the distillate by cooling and filtration. The filtrate is fractionated and there are obtained methanol and water as well as oxidation intermediates, the latter being admixed to a new batch. There are obtained per hour 180 to 190 parts of dimethyl terephthalate and about 50 parts of oxidation intermediates, which are returned to the oxidation process.

*Example 12*

In a pressure vessel of 0.35 part by volume there are placed 228 parts of methanol and 12 parts of a technical-grade mixture of isomers of xylene of the following composition:

20% para-xylene
    30% ortho-xylene
    45% meta-xylene and
    5% ethylbenzene 3.6 parts of cobalt bromide and 36 parts of manganese acetate are added to the solution. While shaking, the vessel is heated to 200° C. and oxygen cautiously forced in up to a pressure of 70 atmospheres. After some time the pressure falls to about 60 atmospheres. It is restored to 70 atmospheres by forcing in further oxygen and the supply of oxygen is repeated until no further fall in pressure is observed even after a prolonged period.

The reaction mixture consists of 12.5 parts of a mixture of dicarboxylic acid dimethyl esters, 0.7 part of benzoic acid ester and 5 parts of a mixture of toluic acid esters. The latter mixture is admixed to a new batch, the yield of dicarboxylic acid dimethyl ester thus being increased to 18.5 parts.

We claim:
1. A process for the production of iso- and terephthalic acid dialkyl esters of lower alkanols with 1 to 4 carbon carbon atoms which comprises reacting in liquid phase at least one benzene hydrocarbon with two oxidizable side chains in the same position as the desired diester, said hydrocarbon being selected from the group consisting of dialkyl benzenes with 1 to 4 carbon atoms in each side chain and chlorine-substituted dialkylbenzenes of the same alkyl chain length in which in at least one carbon atom of at least one alkyl group up to two hydrogen atoms are substituted by chlorine, in an alkanolic solution which contains at least 60 to about 98% by weight of an alkanol with 1 to 4 carbon atoms with reference to the weight of the whole solution, with a gas containing molecular oxygen at a temperature between 120° and 220° C. and at a pressure of at least 8 atmospheres up to about 500 atmospheres.

2. A process as claimed in claim 1 wherein the oxidation and simultaneous esterification is carried out in the presence of an oxidation catalyst.

3. A process as claimed in claim 1 wherein a solution of xylene in methanol is used as the initial solution.

4. A process as claimed in claim 1 wherein a methanolic solution of a dialkylbenzene in which at least one of the alkyl groups is an isopropyl group is used as the initial solution.

5. A process as claimed in claim 1 wherein the initial solution is a solution of xylylene dichloride in methanol.

6. A process for the production of iso- and terephthalic acid dimethyl esters which comprises reacting in the liquid phase a methanolic solution of a di-isopropylbenzene which contains the isopropyl groups in the same positions as the desired dimethyl ester, said solution containing at least 60% up to about 98% by weight of methanol, with a gas containing molecular oxygen at a temperature between 120° and 220° C. and at a pressure of at least 8 atmospheres up to about 500 atmospheres.

7. A process as claimed in claim 1 wherein the liquid reaction solution contains from 80 to 95% by weight thereof of said alkanol.

References Cited in the file of this patent

UNITED STATES PATENTS 2,779,782    Lotz                    Jan. 29, 1957
2,879,289    Johnson              Mar. 24, 1959